June 4, 1946.　　　　　J. MIHALYI　　　　　2,401,704
RANGE FINDER
Filed March 13, 1943　　　　2 Sheets-Sheet 2
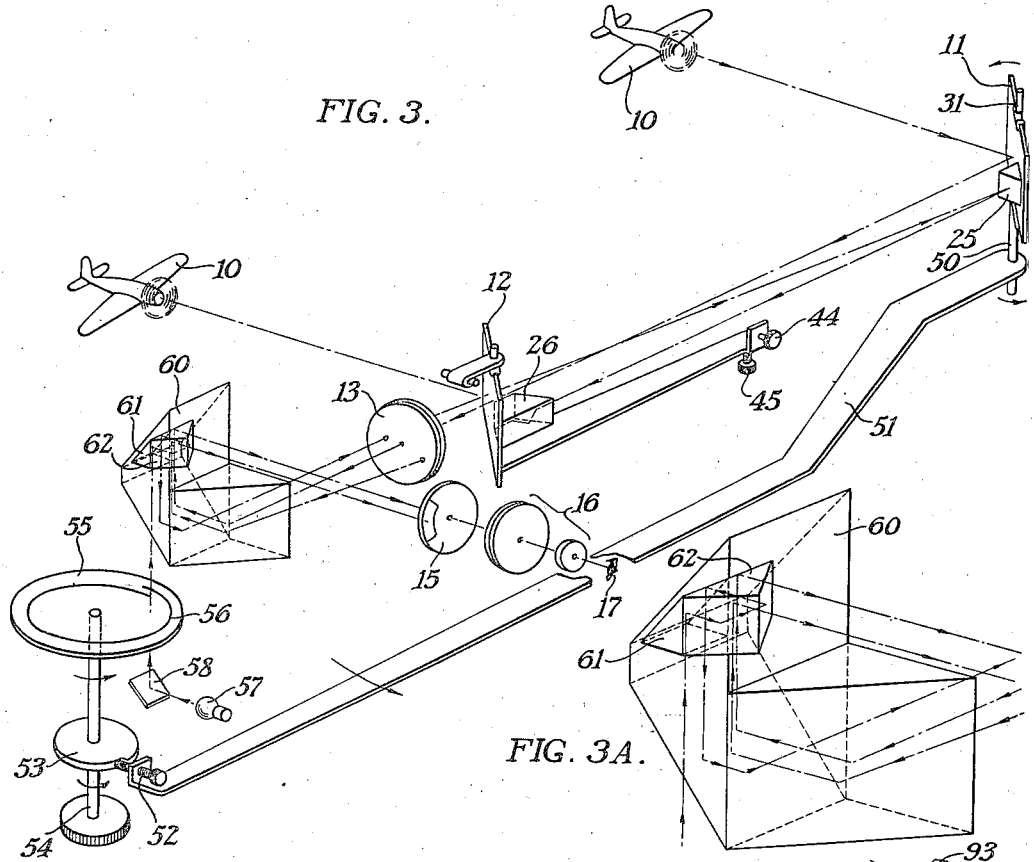
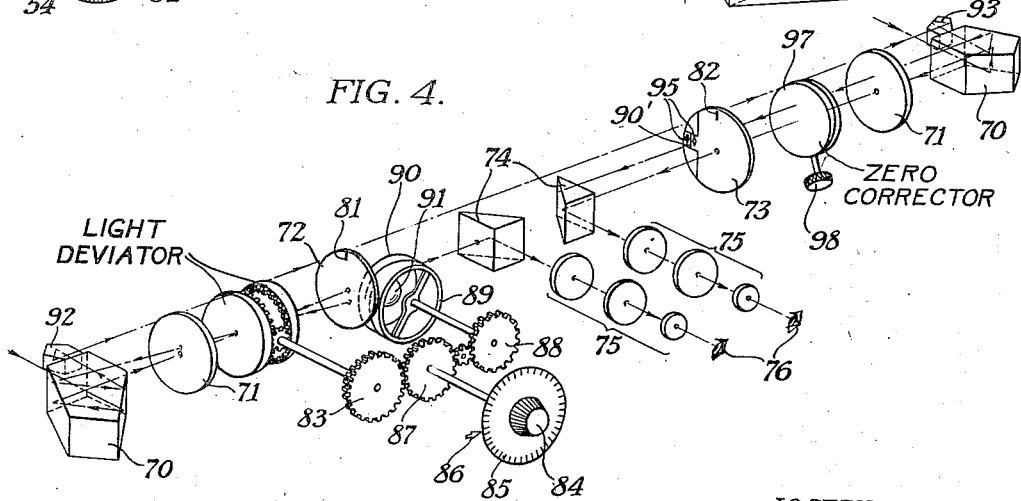
JOSEPH MIHALYI
INVENTOR
ATTY & AG'T Patented June 4, 1946

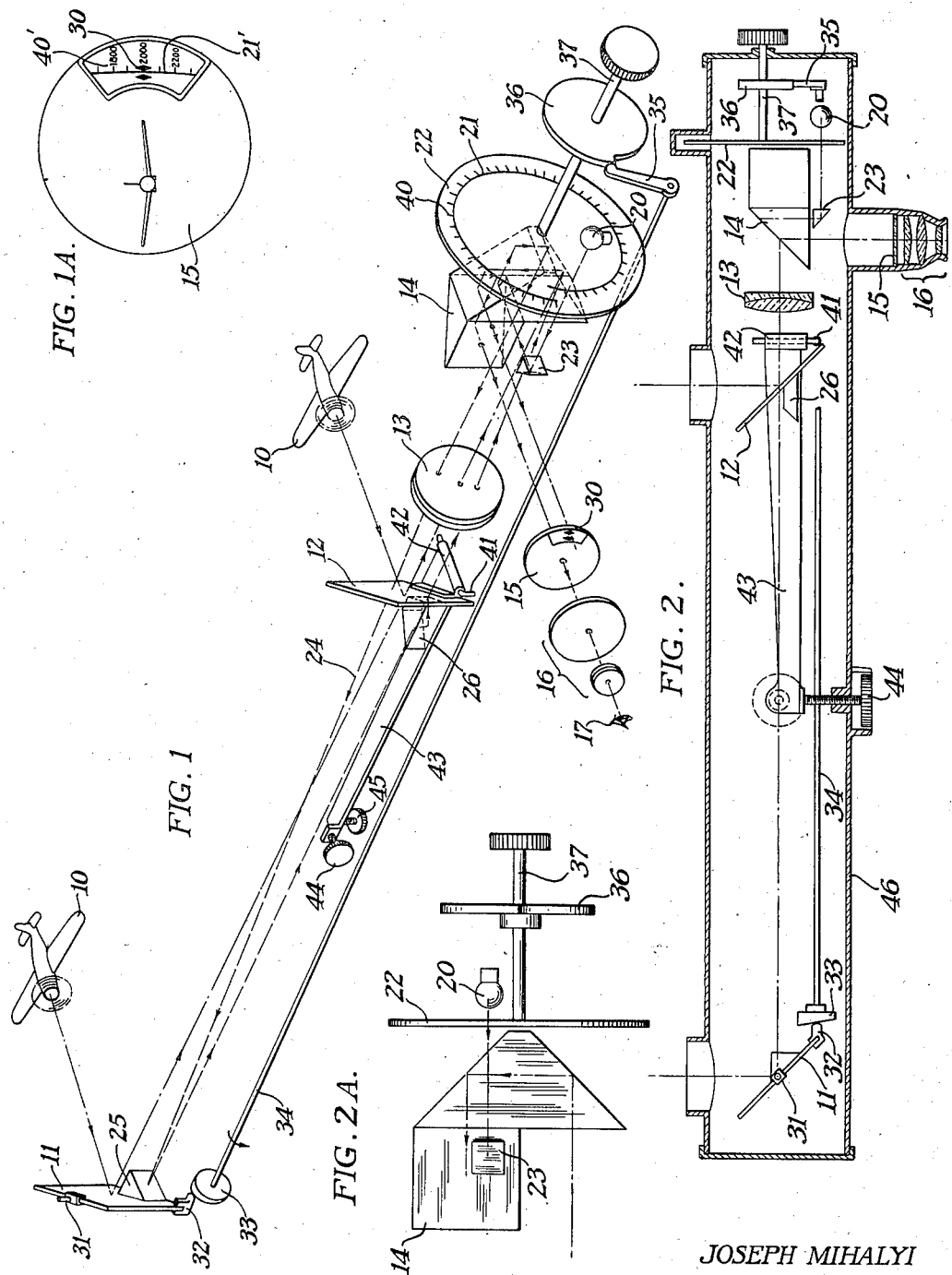

2,401,704

UNITED STATES PATENT OFFICE 2,401,704

RANGE FINDER

Joseph Mihalyi, Rochester, N. Y., assignor to Eastman Kodak Company, Rochester, N. Y., a corporation of New Jersey Application March 13, 1943, Serial No. 479,096

14 Claims. (Cl. 88—2.7)

This invention relates to range finders.

This is Case F of a series of applications relating to the same subject. This series includes:

| Title | Serial No. | Filed | Inventors |
| --- | --- | --- | --- |
| Mount for optical element. | 461,584 | Oct. 10, 1942 | Mihalyi. |
| Range finder construction. | 461,585 | Oct. 10, 1942 | Do. |
| Range finders—Case A | 472,831 | Jan. 19, 1943 | Do. |
| Range finders—Case B | 472,832 | Jan. 19, 1943 | Do. |
| Range finders—Case C | 472,833 | Jan. 19, 1943 | Do. |
| Range finders—Case D | 472,834 | Jan. 19, 1943 | Mihalyi, MacNeille. |
| Range finders—Case E | 472,835 | Jan. 19, 1943 | Mihalyi, Tuttle. |
| Range finders—Case G | 479,097 | Mar. 13, 1943 | Mihalyi. |
| Range finders—Case H | 479,098 | Mar. 13, 1943 | Holmes, Mihalyi. |
| Range finders—Case I | 479,099 | Mar. 13, 1943 | Mihalyi, MacNeille. |
| Range finders—Case J | 479,100 | Mar. 13, 1943 | MacNeille, Holmes. |
| Range finders—Case K | 479,101 | Mar. 13, 1943 | Mihalyi, MacNeille. |
| Range finders—Case L | 479,102 | Mar. 13, 1943 | Mihalyi. |
| Range finders—Case M | 491,954 | June 23, 1943 | MacNeille. |
| Range finders—Case N | 491,955 | June 23, 1943 | MacNeille, Mihalyi. |
| Range finders—Case O | 491,956 | June 23, 1943 | MacNeille. |
| Range finders—Case P | 505,016 | Oct. 5, 1943 | MacNeille, Mihalyi. |
| Range finders—Case T | 508,186 | Oct. 29, 1943 | MacNeille. |

The first two of the above listed cases relate to specific details of the range finder whose optical system is described in the present Case F. Cases A, B and C describe autocollimating range finders in which an image of one adjustment coindicant element is projected adjacent to the other, the element light beam passing through the range finder optical system to compensate for any maladjustment therein. Although the present Case F incorporates the same principle as these first three cases, one fundamental difference is that the invention in the present Case F primarily indicates the maladjustment rather than correcting it automatically. Cases D and E are primarily directed to devices for expanding the scale of the range finder to permit ease of reading or direct coupling into military directors. Case E describes a system in which the adjustment coindicant elements are a fiducial mark and coincidence line; this may be considered a null type instrument having "autocollimation" and hence this term is used with reference to Case E and similar systems although strictly speaking they are not "auto" collimating. The present Case F employs the same two elements in a somewhat different way, i. e. to permit range correction setting but it is also included in the term "autocollimating" because effectively the same principle is involved. Thus the term "autocollimating" is used generically to define range finders involving this form of optical control.

The object of the present Case F is primarily to permit simplification in the design and operation of a range finder having all of the advantages of the finder described in Case E. This simplification of operation permits readings to be taken much more rapidly and in a vast majority of cases, almost instantaneously, which, of course, is necessary when ranging on a moving aeroplane.

It is an object of this invention to permit ranges to be read directly, correctly and instantaneously as long as the instrument is in proper adjustment and to give a direct indication in the eyepiece of the system, if the finder is out of adjustment. To obtain this object, a coincidence line and fiducial mark are used primarily to indicate adjustment. That is, they are in coincidence when the instrument is in proper adjustment and are out of coincidence when it is out of adjustment.

The object of one preferred embodiment of the invention is to permit correction of any maladjustment of the instrument while taking a reading, and in one particular case, without interfering in any way with the taking of the reading. This embodiment is particularly useful when ranging on a moving object. For example, the range may be adjusted with one hand and, if the present invention indicates maladjustment of the instrument, the adjustment may be corrected with the other hand.

These objects are obtained in a range finder (of the type having two spaced viewing points at which light beams are received from the object being ranged to pass through an optical system to form images of this object and also having a ranging adjuster) by providing a fiducial mark and coincidence line on a movable member as adjustment coindicant elements. Light from one of these elements is projected through at least part of the optical system of the range finder and either passes through the ranging adjuster and/or is moved thereby to form an image of this element adjacent to the other element and for moving the image relative to the other element in accordance with the adjustment of the range finder. The system is characterized by mechanical means coupling the ranging adjuster and the movable member to move them synchronously and thus to maintain coincidence of the element image and the other element as long as the range finder remains in proper adjustment. With such an arrangement any lack of proper adjustment is promptly indicated by lack of coincidence of the indicating elements.

Preferably, means are included for altering the effective adjustment of the ranging adjuster relative to the movable member to bring the co-indicating elements into coincidence, and hence, to counteract the maladjustment of the instrument. This may be accomplished directly by movement of the member carrying the coincidence line as in Case E, but preferably is accomplished by having the correcting means quite independent of the ranging adjuster but operating on the light beams passing through the range finder optical system. For example, a separate light deviating means may be provided to correct the lack of coincidence, and hence, to counteract the maladjustment.

In one preferred embodiment of the invention a scale is included adjacent to the coincidence line to move therewith and preferably the index for this scale consists of the fiducial mark cooperating with the coincidence line. Of course, this mark acts as an index in a direction at right angles to that to which it acts as a fiducial mark. One preferred form of fiducial mark consists of two spots such as diamond shaped spots separated by an effective distance between one-half and three times the thickness of the coincidence line. This permits easy determination of coincidence indicated by the line being accurately halfway between the two spots. One preferred form of coincidence line is a spiral on a rotatable member with the pitch of the spiral matched to the relative shift of the element image and the other element when the ranging adjuster, which is coupled to the rotatable member, is adjusted. For example, the rotatable member carrying the spiral can operate a cam and cam follower which in turn operate the primary light deviator of the range finder system. A separate deviator in the range finder system may be adjustable to correct for lack of coincidence, and hence, for maladjustment of the system.

The invention will be fully understood from the following detailed description of various embodiments thereof, when read in connection with the accompanying drawings in which:

Fig. 1 is a perspective view of the optical system of one embodiment of the invention, Fig. 1A being to view through the eyepiece of this embodiment, Fig. 2 is a plan view of a range finder incorporating the optical system shown in Fig. 1 and Fig. 2A is a front elevation of one detail of Fig. 2, Fig. 3 is a perspective view of a slightly different embodiment of the invention, Fig. 3A being an enlarged detail to show the paths of the light rays accurately, Fig. 4 illustrates one form of this invention applied to stereo range finders.

In Figs. 1, 1A, 2 and 2A light from a distant object represented by two small aeroplanes 10 is received at the viewing points of the instrument and the two beams are reflected respectively by a mirror 11 and a semi-transparent mirror 12 through an objective 13 and an erecting prism 14 into focus in an image plane 15 to be viewed through an eyepiece 16 by the eye 17 of an observer. The mirror 11 is pivoted to rotate about a pivot 31 and is movable by a cam follower 32 engaging a cam 33 which is rotated by a rod 34 and cam follower 35 which in turn engages another cam 36 which may be rotated manually by a shaft 37. This operation is performed to bring the two images of the object being ranged into coincidence. The shaft 37 also carries a disk 22 on which is engraved a spiral coincidence line 21. Light from this line 21 as illuminated by a lamp 20 is reflected by a prism 23 into the erecting prism 14, and thence, through the objective 13 as indicated by the ray 24 to be reflected by a prism 25 cemented to the mirror 11. This reflected ray then enters a dove prism 26 cemented to the semi-transparent mirror 12 and is brought to focus by the objective 13 forming an image 21' as seen in Fig. 1A between two fiducial mark spots 30 engraved on the image plane 15. The spiral 21 is so curved that as long as the instrument stays in proper adjustment, the image 21' remains between the fiducial mark spots 30 as the light deviator is adjusted which in this case is the rotatable mirror 11. Adjacent to the spiral 21, a scale 40 is engraved so that its image 40' may also be seen in the image field 15. The fiducial mark 30 acts as the index for this scale hence permitting the range to be read directly as soon as the object images are in coincidence.

If for any reason the instrument gets out of adjustment, this scale reading would, of course, be incorrect. However, since the light beam from the scale and coincidence line passes through all of the optical system of the range finder it too will suffer whatever maladjustment exists in the instrument and in this case the image 21' will not appear between the spots 30. This might be corrected by rotating the disk 22 relative to the shaft 37 until coincidence is achieved, at which time the scale reading should be correct, but I prefer to provide an independent light deviating means in the range finder system to compensate for the maladjustment. In Figs. 1 and 2 this auxiliary light deviating means is provided by mounting the mirror 12 and dove prism 26 on a support 43 which is pivoted for universal movement about a horizontal pivot 42 and a vertical pivot 41. Rotation about the pivot 41 as provided by an adjustment screw 44 corrects the maladjustment discussed above and brings the image 21' back between the spots 30. At the same time, it moves one of the object images so that adjustment of the mirror 11 is necessary to bring the object images back into coincidence at which time the scale 40' gives the correct reading. Rotation of the mirror 12 about the pivot 42 as provided by the adjustment screw 45 permits halving adjustment so that the object images appear in the same horizontal plane. In Fig. 2 this whole instrument is shown mounted in a housing 46. Preferably the prism 23 is cemented to the erecting prism 14 but is shown separated therefrom for clarity.

In Fig. 3 the same optical system is used but for convenience the range control shaft is mounted vertically. The mirror 11 in this case is rotated by a shaft 50 and a long arm 51 which carriers an adjustable cam follower 52 engaging a cam 53 which rotates with manual rotation of a shaft 54. As before, this shaft carries a disk 55 with a spiral coincidence line 56 illuminated by a lamp 57 and mirror 58. Light from this line 56 passes upward into a prism 61 and thence into a roof prism 62 and into the erecting prism 60 of the range finder system. The operation of this embodiment is similar to that shown in Fig. 1.

In Fig. 4, the invention is applied to a stereo range finder. Light from the object being ranged is received by two penta prisms 70 and is focused by objectives 71 in image planes 72 and 73 respectively. These images are viewed stereoscopically through prisms 74 and eyepieces 75 by the eyes 76 of an observer. The image planes are provided respectively with marks 81 and 82 which viewed stereoscopically give an apparent mark distance and the apparent object distance is adjusted to match this when ranging. This adjustment is provided by a gear 83 engaging a light deviator such as mutually rotatable wedges. This gear 83 is rotated by a knob 84 and gear 87 and the range may be read by an index 86 against a scale 85 also operated by the knob 84.

According to the invention this knob 84, through a gear train 87 and 88 rotates a cylinder 89 carrying a coincidence line 90 in the form of a spiral thereon. This coincidence line 90 is illuminated by a lamp 91 and light therefrom passes through the objective 71 and penta prism 70 into a small auxiliary penta prism 92 whence it is reflected to another penta prism 93 adjacent to the other viewing point and thence back into the range finder system. This element light is brought to focus by the objective 71 to form an image 90' between two fiducial spots 95 engraved on the image plane 73. As long as the range finder stays in proper adjustment, this image 90' stays between the spots 95 and of course the scale 85 and index 86 give the correct reading. However, if the instrument gets out of adjustment as indicated by the coincidence line image 90' moving out of coincidence with the spots 95, correction can be provided by a zero corrector 97 which consists of rotatable wedges operated by a knob 98. This adjustment brings the coincidence line back between the spots 95 and also moves the object image as seen in the plane 73 so that the apparent object distance is different and when the mark 81 is moved to make the apparent mark distance the same as the apparent object distance, the image 90' remaining, of course, between the spots 95, the scale 85 and index 86 will give the correct range.

Having thus described various embodiments of this invention, I wish to point out that it is not limited to these structures but is of the scope of the appended claims.

What I claim and desire to secure by Letters Patent of the United States is:

1. A range finder of the type having two spaced viewing points at which beams of light are received from the object being ranged, an optical system for forming images of the object, a ranging adjuster, a coincidence line on a movable member and a fiducial mark as adjustment coindicant elements and means, including the adjuster and at least part of the finder optical system, for projecting an image of one of the elements adjacent to the other and for moving them relative to one another in accordance with the adjustment of the range finder, said range finder being characterized by means coupling the ranging adjuster and the movable member for moving them synchronously to maintain coincidence of the element image and the other element as long as the finder is in proper adjustment whereby lack of proper adjustment is indicated by lack of coincidence of the element image and other element.

2. A range finder according to claim 1 including means for altering the effective relative adjustment of the ranging adjustor and the movable member to obviate said lack of coincidence whereby said lack of proper adjustment is counteracted.

3. A range finder according to claim 1 including light deviating means independent of said ranging adjustor for deviating one of the object beams and the element image beam to obviate said lack of coincidence.

4. A range finder according to claim 1 in which a scale is included adjacent to and along the coincidence line to move therewith.

5. A range finder according to claim 1 in which a scale is included adjacent to and along the coincidence line to move therewith and said fiducial mark acts as the index for the scale.

6. A range finder according to claim 1 in which said fiducial mark consists of two spots separated by an effective distance between one-half and three times the coincidence line thickness.

7. A range finder according to claim 1 in which the coincidence line is a spiral on a rotatable member with the pitch of the spiral matched to the relative shift of the element image and the other element due to the ranging adjustor coupled to said member.

8. A coincidence range finder in which two beams of light from an object being ranged are aligned and focused to form images which are brought into coincidence by a light deviator operating on one of the light beams characterized by a coincidence line on a movable member and a fiducial mark as adjustment coindicant elements, means for projecting through the light aligning and deviating system a light beam to form an image of one element adjacent to the other, means for synchronously moving the coincidence line member and the light deviator to maintain coincidence of the element image and other element as long as the finder is in proper adjustment and means for deviating the element image beam to correct any lack of proper adjustment.

9. A range finder according to claim 8 including a scale and index operated by said movable member.

10. A range finder according to claim 8 in which the last mentioned deviating means is mechanically independent of the first mentioned light deviator.

11. A range finder according to claim 8 in which a scale is adjacent to and along the coincidence line and the fiducial mark acts as the index for the scale.

12. A range finder according to claim 8 in which said fiducial mark consists of two spots separated by an effective distance between one-half and three times the coincidence line thickness.

13. A range finder according to claim 8 in which the coincidence line is a spiral on a rotatable member coupled to operate the light deviator and the pitch of the spiral is matched to the element image shift caused by the operation of the light deviator.

14. A range finder according to claim 8 including a rotatable member and in which the coincidence line is a spiral on a unit rotatable by said rotatable member, a cam is moved by the rotatable member, a cam follower riding thereon is connected to operate the light deviator and the synchronously moving means consists of means for rotating the rotatable member.

JOSEPH MIHALYI.